US012373369B2

(12) United States Patent
Tresidder et al.

(10) Patent No.: US 12,373,369 B2
(45) Date of Patent: Jul. 29, 2025

(54) SCHEDULING TRAINING OF AN INTER-CHIPLET INTERFACE

(71) Applicant: Advanced Micro Devices, Inc., Santa Clara, CA (US)

(72) Inventors: Michael J. Tresidder, Austin, TX (US); Benjamin Tsien, Santa Clara, CA (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 95 days.

(21) Appl. No.: 17/853,842

(22) Filed: Jun. 29, 2022

(65) Prior Publication Data

US 2024/0004815 A1 Jan. 4, 2024

(51) Int. Cl.
*G06F 13/364* (2006.01)
*G06F 1/3234* (2019.01)
*G06F 9/48* (2006.01)
*G06F 13/42* (2006.01)

(52) U.S. Cl.
CPC .......... *G06F 13/364* (2013.01); *G06F 9/4893* (2013.01); *G06F 1/3253* (2013.01); *G06F 13/4282* (2013.01); *G06F 2213/0026* (2013.01)

(58) Field of Classification Search
CPC .............................. G06F 13/364; G06F 9/4893
See application file for complete search history.

(56) References Cited

U.S. PATENT DOCUMENTS

| 7,633,877 | B2 * | 12/2009 | Sharma | H04L 43/50 |
| | | | | 370/241 |
| 8,437,343 | B1 * | 5/2013 | Wagh | G06F 13/4282 |
| | | | | 370/359 |
| 8,949,497 | B2 * | 2/2015 | Hopgood | G06F 13/4282 |
| | | | | 710/104 |
| 10,552,357 | B2 * | 2/2020 | Wu | G06F 1/10 |
| 10,841,355 | B2 * | 11/2020 | Sengoku | H04L 65/61 |
| 10,866,625 | B2 * | 12/2020 | Schneider | H04L 12/12 |
| 10,887,075 | B2 * | 1/2021 | Srivastava | H04L 25/20 |
| 11,100,028 | B1 * | 8/2021 | Subramaniam | G06F 13/4221 |
| 2018/0287771 | A1 * | 10/2018 | Srivastava | G06F 13/4072 |

(Continued)

OTHER PUBLICATIONS

"Ultra-Short-Reach Interconnects for Die-to-Die Links" by Behzad Dehlaghi, Nijwm Wary, and Tony Chan Carusone from IEEE Solid-State Circuits Magazine (vol. 11, Issue 2, Spring 2019); 12 Pages (Year: 2019).*

(Continued)

*Primary Examiner* — Brian T Misiura
(74) *Attorney, Agent, or Firm* — Volpe Koenig

(57) ABSTRACT

Systems and methods are disclosed for scheduling a data link training by a controller. The system and method include receiving an indication that a physical layer of a data link is not transferring data and initiating a training process of the physical layer of the data link in response to the indication that the physical layer of the data link is not transferring data. In one aspect, the indication that the physical layer of a data link is not transferring data is an indication that the physical layer of the data link is in a low power state. In another aspect, the indication that the physical layer of a data link is not transferring data is an indication that a data transfer has been completed.

21 Claims, 6 Drawing Sheets

(56) References Cited

U.S. PATENT DOCUMENTS

2022/0318111 A1* 10/2022 Choudhary ........... G06F 11/263
2024/0004821 A1* 1/2024 Tresidder .................. G06F 1/26

OTHER PUBLICATIONS

"Ultra-Short-Reach Interconnects for Die-to-Die Links"—by Behzad Dehlaghi, Nijwm Wary, and Tony Chan Carusone. Published in IEEE Solid-State Circuits Magazine on Jun. 24, 2019; 12 Pages (Year: 2019).*

* cited by examiner

100

200

300

400

500

600

RECEIVE AN INDICATION THAT A PHYSICAL LAYER OF A DATA LINK IS NOT TRANSFERRING DATA
610

INITIATE A TRAINING PROCESS OF THE PHYSICAL LAYER OF THE DATA LINK
620

SEND TO A TRANSPORT LAYER AN EXIT REQUEST MESSAGE THAT REQUESTS TO PLACE A PHYSICAL LAYER, RESIDING IN A LOW-POWER STATE, IN A HIGH-POWER STATE
710

RECEIVE FROM THE TRANSPORT LAYER A REPLY TO THE EXIT REQUEST MESSAGE, CONFIRMING THAT THE PHYSICAL LAYER IS IN A HIGH-POWER STATE
720

INITIATE A TRAINING PROCESS OF THE PHYSICAL LAYER
730

RECEIVE ENTRY REQUEST MESSAGE FOR CONFIRMATION THAT A PHYSICAL LAYER, RESIDING IN A HIGH-POWER STATE, IS READY TO BE PLACED IN A LOW-POWER STATE
760

INITIATE A TRAINING PROCESS OF THE PHYSICAL LAYER BEFORE REPLYING TO THE ENTRY REQUEST MESSAGE
770

FIG. 7B

SCHEDULING TRAINING OF AN INTER-CHIPLET INTERFACE

BACKGROUND

A recent trend in chip design is a system architecture that is constructed of multiple chiplets on a package. A system of multiple chiplets offers modularity and flexibility in manufacturing. In a system of multiple chiplets, multiple chiplet systems use data links in which data is transferred between chiplets through a communication channel that connects the chiplets' inter-chiplet interfaces, such as an ultra-short-reach (USR) interconnect.

BRIEF DESCRIPTION OF THE DRAWINGS

A more detailed understanding may be had from the following description, given by way of example in conjunction with the accompanying drawings wherein:

FIG. 6 is a flowchart of an example method for scheduling a data link training according to features of the disclosure;

FIG. 7A is a flowchart of an example method for scheduling a data link training, based on which one or more features of the disclosure can be implemented; and FIG. 7B is a flowchart of another example method for scheduling a data link training, based on which one or more features of the disclosure can be implemented.

DETAILED DESCRIPTION

Figure 1:
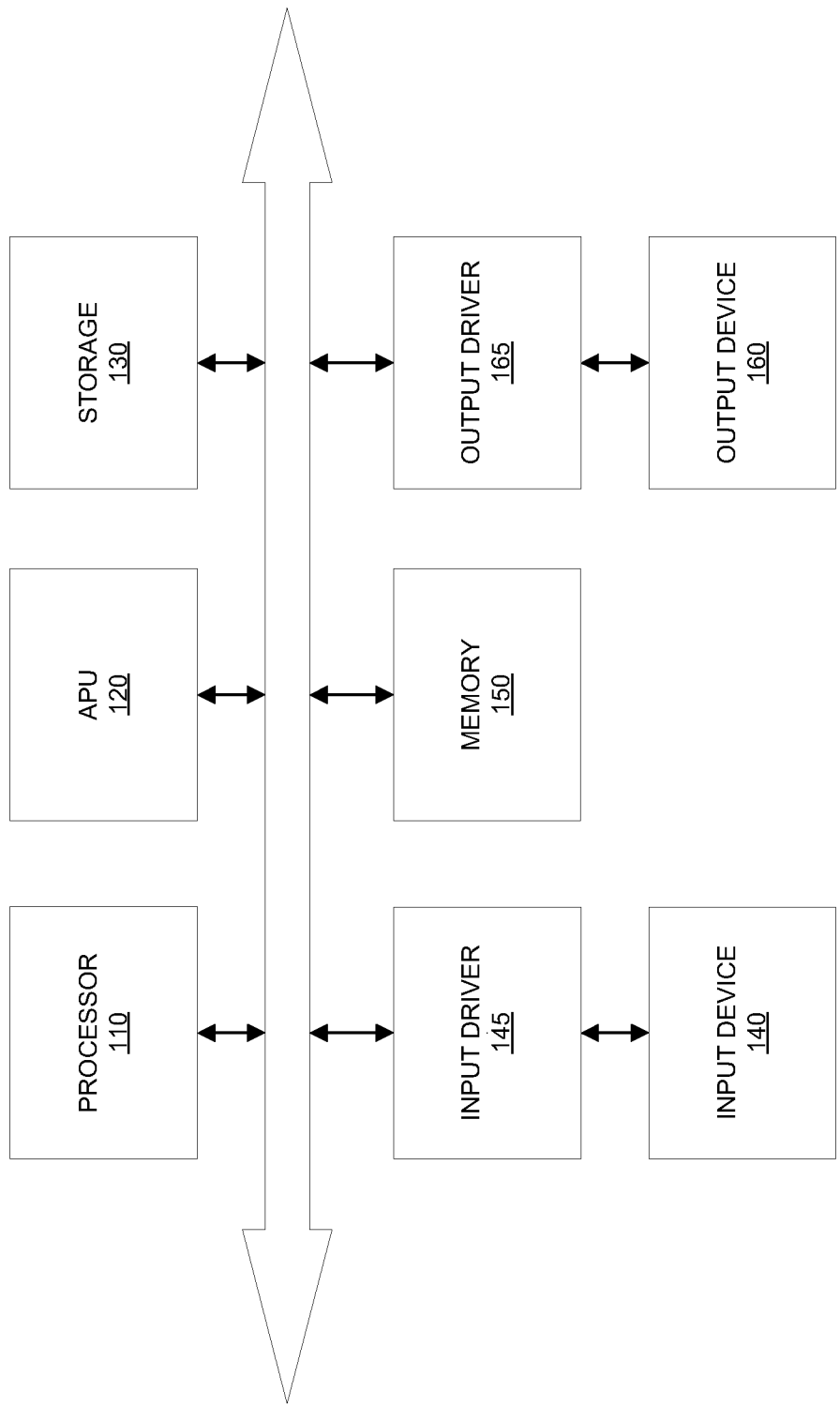
FIG. 1 is a block diagram of an example system, based on which one or more features of the disclosure can be implemented.

Due to variations in the operational environment of the inter-chiplet interfaces and in the manufacturing of their circuitry, the inter-chiplet interfaces are periodically trained to adjust the operational parameters of the circuitry. Consequently, during training, the inter-chiplet interfaces are not available to transfer data through the communication channel.

Features of the present disclosure, include systems and methods for scheduling the training of an inter-chiplet interface (referred to herein interchangeably as a chiplet, an inter-chiplet interface and a data link), in a manner that minimizes interference with the data transfer. Further, in the presence of hard real-time requirements of isochronous data transfers, such training is performed in a manner that does not compromise the latency requirements of the isochronous data transfers.

To train the data link while minimizing the interference with data transfers through the inter-chiplet interface, features of the present disclosure schedule (via a controller) the training of the data link. (e.g., the training of circuitry of the physical layer of the data link) when the data link is not transferring data (i.e., not being used for transferring data).

An indication is received (e.g., by a controller) that a physical layer of the data link is not transferring data and, therefore, that training of the data link can be performed without interfering with the data transfer. As described in more detail below, the indication that the physical layer of the data link is not transferring data is, for example, an indication that the physical layer of the data link is in a low power state. Alternatively, the indication that the physical layer of the data link is not transferring data is an indication that a data transfer has been completed.

For example, in a first aspect, training is scheduled while the physical layer is in a low power state (i.e., inactive and not being used for transferring data) by placing it in a high power state for the purpose of the training. Alternatively, in a second aspect, the training is scheduled when the physical layer has concluded a data transfer but before it is placed in a low power state (i.e., still in a high power state but not presently being used for transferring data). When a transport layer of the data link requests that data be transferred during the training of the physical layer, the training process is, for example, exited before the training is concluded to minimize interference with data transfers. A decision to exit the training process before its completion is, for example based on a latency constraint or an urgency level associated with the request for data transfer.

Aspects of the present disclosure describe a method for scheduling a data link training by a controller. The method comprises receiving an indication that a physical layer of a data link is not transferring data and initiating a training process of the physical layer of the data link in response to the indication that the physical layer of the data link is not transferring data. In one aspect, the indication that the physical layer of a data link is not transferring data is an indication that the physical layer of the data link is in a low power state. In another aspect, the indication that the physical layer of a data link is not transferring data is an indication that a data transfer has been completed.

Aspects of the present disclosure describe a system for scheduling a data link training. The system comprises a data link comprising: a physical layer configured to transfer data to and from the data link and a controller. The controller is configured to receive an indication that a physical layer of a data link is not transferring data and initiate a training process of the physical layer of the data link in response to the indication that the physical layer of the data link is not transferring data.

Further aspects of the present disclosure describe a non-transitory computer-readable medium comprising hardware description language instructions for causing a controller to perform a method for scheduling a data link training. The instructions comprise receiving an indication that a physical layer of a data link is not transferring data and initiating a training process of the physical layer of the data link in response to the indication that the physical layer of the data link is not transferring data.

FIG. 1 is a block diagram of an example system 100. The system 100 can be associated with, for example, a computer, a gaming device, a handheld device, a set-top box, a television, a mobile phone, or a tablet computer. The system 100 can include a processor 110, an accelerated processing unit (APU) 120, storage 130, an input device 140, memory 150, and an output device 160. The system 100 can also include an input driver 145 and an output driver 165. The processor 110 and the APU 120 can represent one or more cores of central processing units (CPUs) and one or more cores of APUs, respectively. The memory 150 can represent volatile or non-volatile memory, including random-access memory (RAM), SRAM, dynamic random-access (DRAM), a cache, or a combination thereof. The processor 110, the APU 120, and the memory 150, or a subset thereof, may be located on the same die or on separate dies. In an aspect, the system 100 can include additional components not shown in FIG. 1.

The APU 120 can represent a graphics processing unit (GPU), that is, a shader system comprising one or more computing units that are configured to perform computations in parallel, for example, in accordance with a single instruction multiple data (SIMD) paradigm. The APU 120 can be configured to accept compute commands and graphics rendering commands from the processor 110, to process those compute and graphics rendering commands, and/or to provide output to a display (the output device 160). In alternative aspects, the APU 120 can be employed to perform signal processing operations (e.g., when embodied in a digital signal processor (DSP)), to perform accelerated operations through the use of a field programmable gate array (FPGA) configured by a bitstream, to perform neural processing operations through the use of a neural processing unit (NPU), or to perform other operations that may be more efficiently performed through the use of an accelerated processing unit rather than by processor 110.

The storage 130 can include fixed or removable storage, for example, a hard disk drive, a solid-state drive, an optical disk, or a flash drive. The input device 140 can represent, for example, a keyboard, a keypad, a touch screen, a touch pad, a detector, a microphone, an accelerometer, a gyroscope, a biometric scanner, or a network connection (e.g., a wireless local area network card for receipt of wireless IEEE 802 signals). The output device 160 can represent, for example, a display, a speaker, a printer, a haptic feedback device, one or more lights, an antenna, or a network connection (e.g., a wireless local area network card for transmission of wireless IEEE 802 signals). In an aspect, the input driver 145 communicates with the processor 110 (or the APU 120) and the input device 140, and facilitates the receiving of input from the input device 140 to the processor 110 (or the APU 120). In another aspect, the output driver 165 communicates with the processor 110 (or the APU 120) and the output device 160, and facilitates the sending of output from the processor 110 (or the APU 120) to the output device 160.

Figure 2:
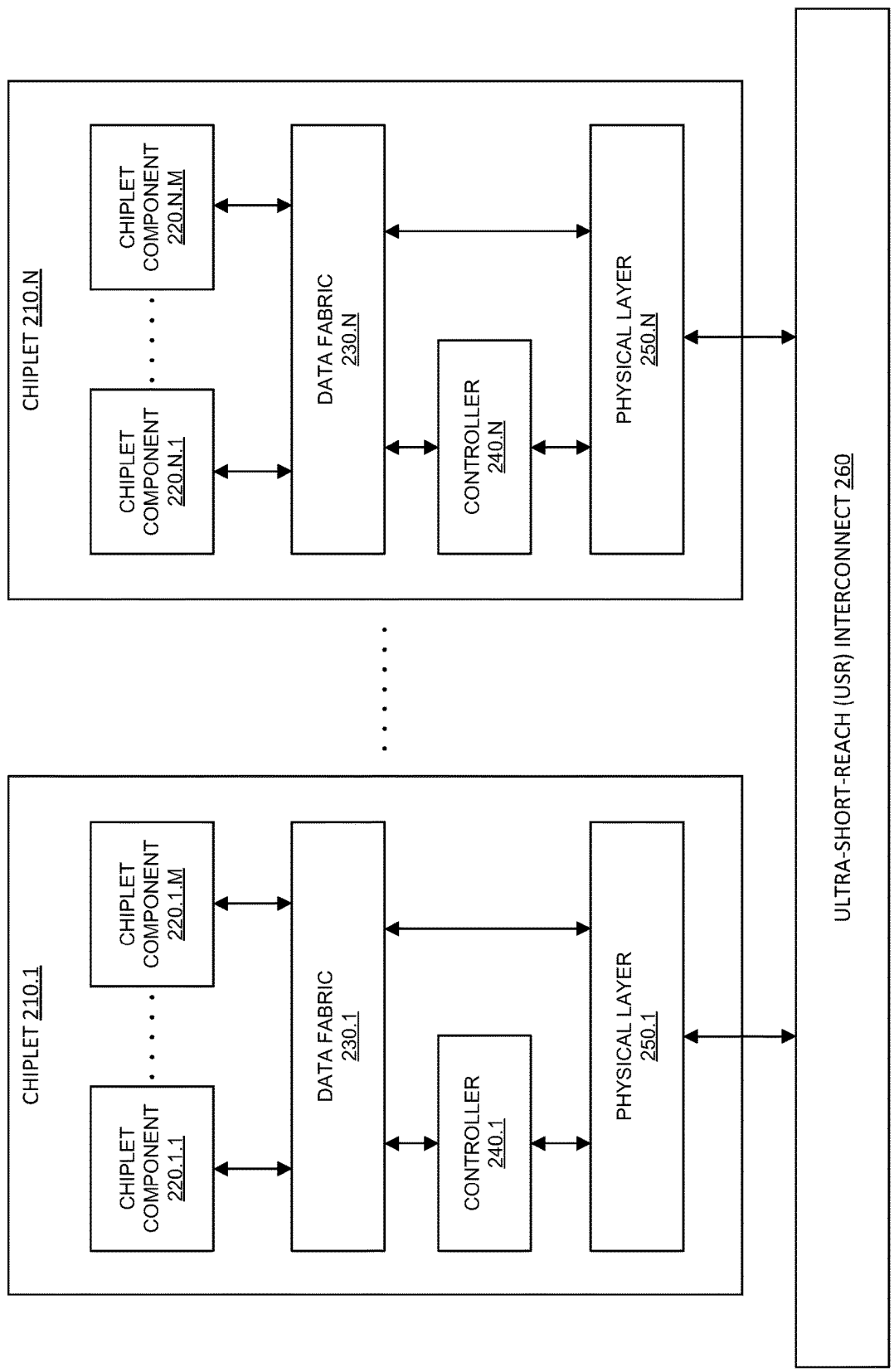
FIG. 2 is a block diagram of an example multiple chiplet system, based on which one or more features of the disclosure can be implemented.

FIG. 2 is a block diagram of an example multiple chiplet system 200. The chiplets 210.1-N (or 210) of the system 200 include integrated circuits that perform different or duplicated functions. A chiplet of the system 200 can, for example, implement the functionality of an APU and/or a processor (e.g., the APU 120 and the processor 110 of FIG. 1) or a sub-component of such functionality. As illustrated in FIG. 2, the chiplets 210 comprise respective chiplet components 220.1.1-M, 220.N.1-M (or 220), data fabrics 230.1-N (or 230), controllers 240.1-N (or 240), and physical layers (PHYs) 250.1-N (or 250). The chiplet components 220 contain circuitry that implements one or more chiplet functions. Chiplet components, for example, components 220.1.1-M of chiplet 210.1, can communicatively connect with each other and with memory (e.g., the memory 150 of FIG. 1) using the chiplet's data fabric 230.1. The chiplets' data fabrics 230 also represent transport layers that facilitate inter-chiplet communication via a USR interconnect 260. For example, a data packet, to be transmitted from component 220.1.1 to component 220.N.1, can travel through a route that includes data fabric 230.1, physical layer 250.1, USR interconnect 260, physical layer 250.N, and data fabric 230.N. In an aspect, a data fabric, e.g., 230.1, can represent multiple data fabrics and/or one or more control fabrics.

Hence, the transmission of data among the chiplets 210 and through the USR interconnect 260 is facilitated by respective physical layers 250. Generally, a physical layer contains transceivers through which data are transmitted and received. Parameters that control the operation of datapath circuitry associated with those transceivers have to be periodically (or as needed) calibrated, due to variations in the system environment and in the manufacturing of the datapath circuitry. The calibration of operational parameters that control the circuitry of the physical layers 250 can be carried out via a training process, conducted by respective controllers 240. When a controller 240 initiates a training process, the datapath circuitry are engaged in the training operation, and are, thus, not available to carry out data transfer. Therefore, features of the present disclosure include scheduling a training process of the physical layers 250 of the chiplets 210 when the physical layers 250 of the chiplets 210 are not being used for transferring data. Techniques for scheduling, by the controllers 240, the training of respective physical layers 250 are described herein in reference to FIGS. 3-7.

Figure 3:
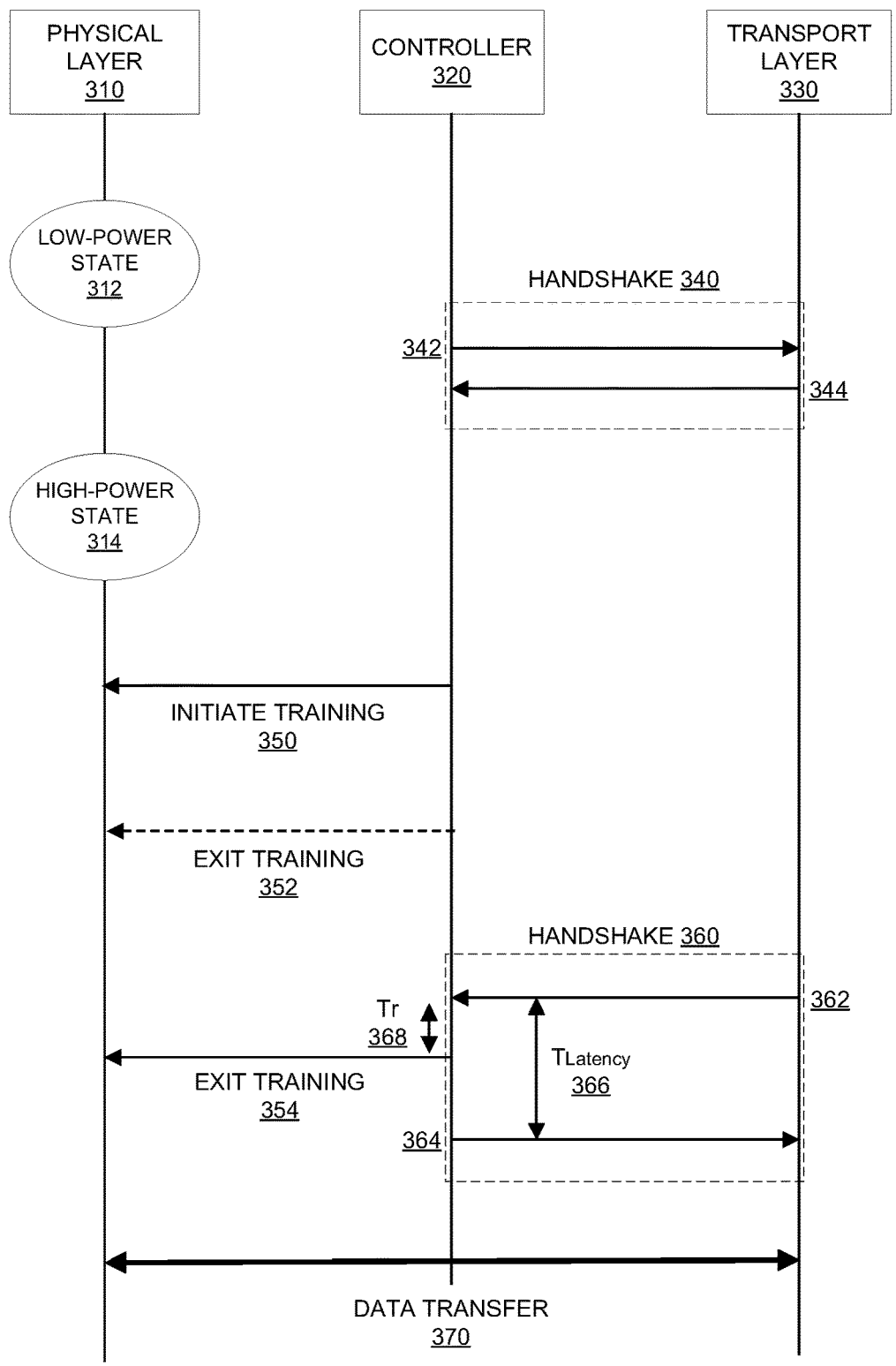
FIG. 3 is a diagram that illustrates a first aspect of scheduling a data link training, based on which one or more features of the disclosure can be implemented.
Figure 4:
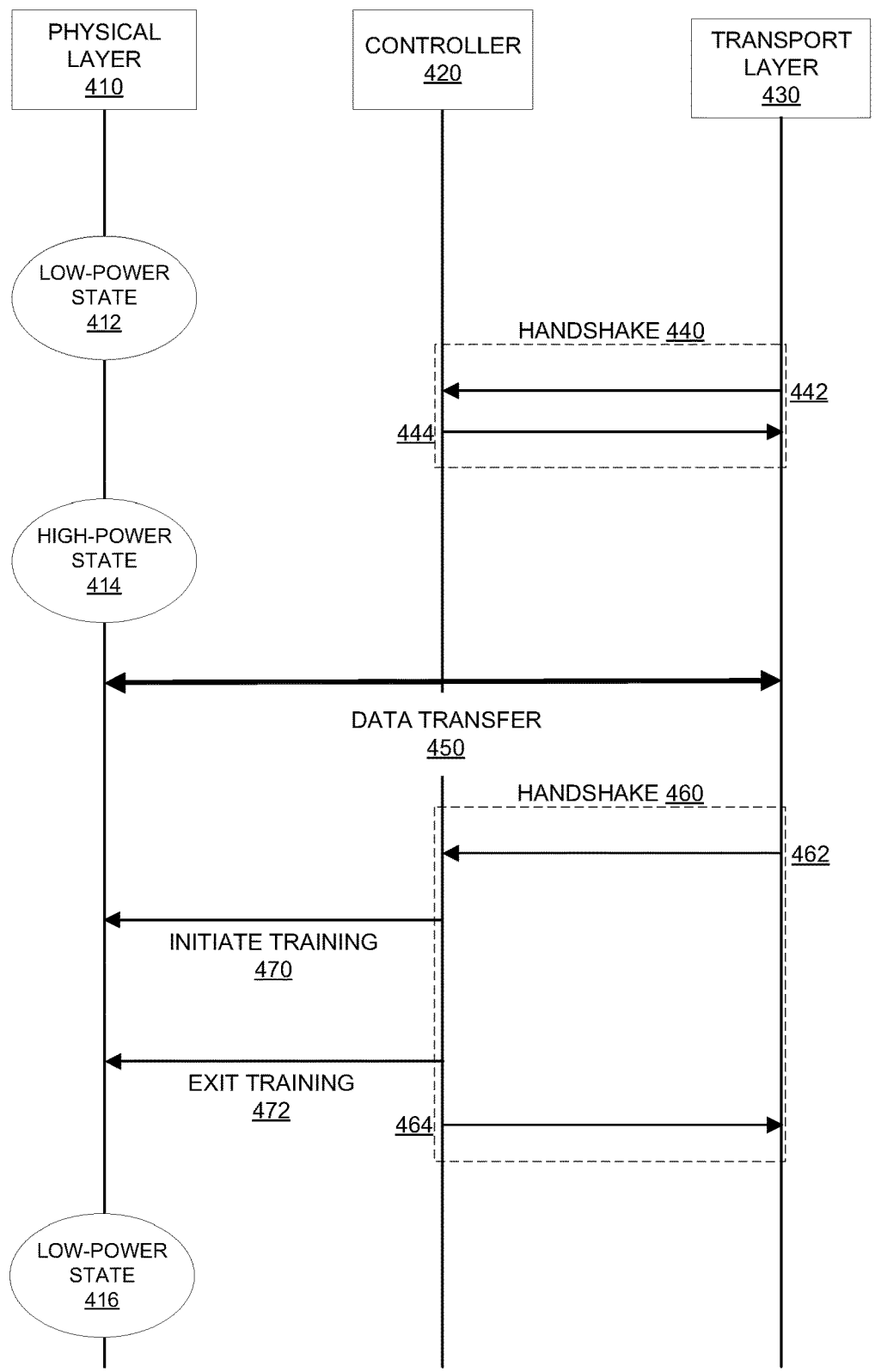
FIG. 4 is a diagram that illustrates a second aspect of scheduling a data link training, based on which one or more features of the disclosure can be implemented.
Figure 5:
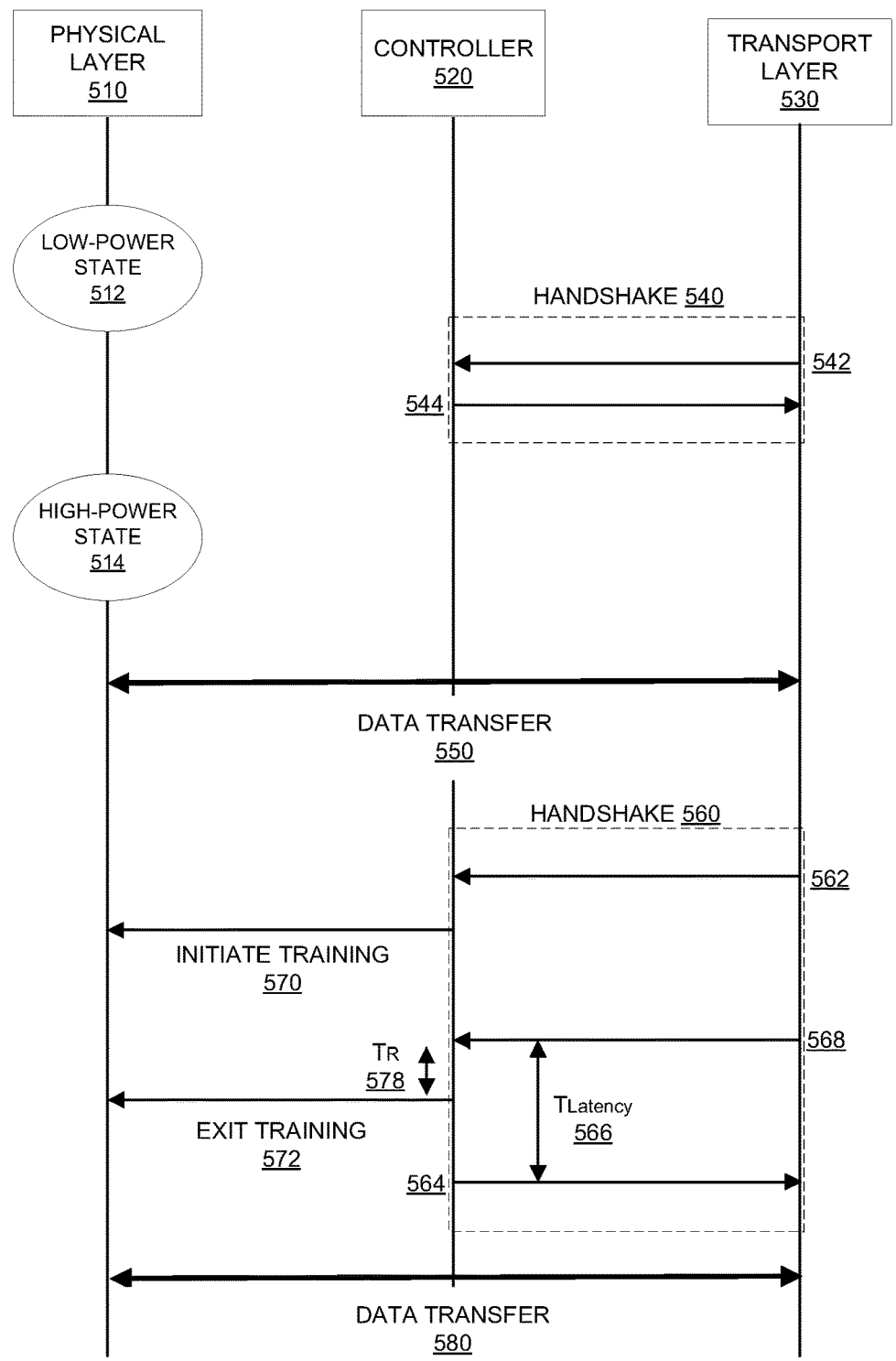
FIG. 5 is a diagram that illustrates a third aspect of scheduling a data link training, based on which one or more features of the disclosure can be implemented.

An indication is received (e.g., by controller 240) that a physical layer 250 of the data link is not transferring data and, therefore, that training of the data link (e.g., chiplet 210) can be performed without interfering with the data transfer. The indication that the physical layer of the data link is not transferring data is, for example, an indication that the physical layer of the data link is in a low power state. Alternatively, the indication that the physical layer of the data link is not transferring data is an indication that a data transfer has been completed. FIGS. 3-5 are diagrams illustrating different aspects in which training of a physical layer of a data link are scheduled when the data link is not being used for transferring data.

FIG. 3 is a diagram that illustrates a first aspect of scheduling a data link training 300. In this aspect, during a time in which a physical layer 310 (e.g., the physical layer 250 of FIG. 2) is in a low power state 312 and when the training of the physical layer 310 is due, a controller 320 (e.g., the controller 240 of FIG. 2) opportunistically schedules a training process. The physical layer 250 is trained while in a low power state because, during such time, the physical layer is not active (i.e., not used for transferring data across the USR interconnect 260). To carry out the training, a handshake 340 process is performed. For example, prior to handshake 340 process, the controller 320 receives an indication that the physical layer 310 is in a low power state 312. That is, in this example, the indication that the physical layer of the data link is not transferring data is the indication that the physical layer of the data link is in a low power state. The controller 320 (through a handshake 340 process) can then send a message, namely, an exit request message 342, to a transport layer 330 (e.g., the data fabric 230 of FIG. 2), requesting to exit the low power state. In response, the transport layer 330 can power up the clocks and voltage levels of the physical layer 310, and then send a reply message 344, confirming that the physical layer 310 is placed in a high power state. At this time, the controller 320 can initiate the training process 350 and exit the training 352 upon completion.

However, when data is scheduled to be transferred across the USR interconnect 260 during the training of the physical layer 310, a decision is made as to whether to complete the training process or abort the training process (e.g., based on a latency constraint or an urgency level associated with the request for data transfer). In this case, the transport layer 330 (through a handshake 360 process) can send a message, namely a data transfer request message 362, to the controller 320, requesting the physical layer's 310 service for data transfer. In response, the controller 320 decides, for example, to complete the training process, before replying 364 to the data transfer request message 362, based on an urgency level associated with the requested data transfer. The requested data transfer can be associated with a latency constraint, denoted $T_{Latency}$ 366, indicating the maximum amount of time the physical layer can spend preparing to provide the requested data transfer service. Typically, the value of $T_{Latency}$ depends on the application associated with the requested data transfer. In response, the controller 320 can assess the amount of time remaining to perform the training of the physical layer 310, denoted $T_R$ 368 and the amount of time determined for the physical layer 310 to prepare for the data transfer, denoted $T_O$. If these time values are sufficiently below (e.g., equal to or below a threshold (e.g., 0.95)) the latency constraint (e.g., $(T_R+T_O)$<0.95· $T_{Latency}$) then the controller 320 can wait for the training process to be completed before sending a reply message 364 to the transport layer 330, indicating that the physical layer is ready to carry out the data transfer 370. However, if these time values are not sufficiently below the latency constraint, then the controller 320 can abort the training process before sending the reply message 364 that indicates its readiness to carry out the data transfer 370. In a case where the training is aborted, the controller 320 can schedule the training after the data transfer 370 has been completed, as described, for example, in reference to FIG. 4 and FIG. 5.

FIG. 4 is a diagram that illustrates a second aspect 400 of scheduling a data link training. In this aspect, a training process of the physical layer is initiated during a time in which a data transfer has been completed but a physical layer is still in a high power state. Initially, a physical layer 410 (e.g., the physical layer 250 of FIG. 2) is in a low power state 412 (i.e., inactive and not presently being used for transferring data), but data is due to be transferred across the USR interconnect 260. Consequently, a transport layer 430 (e.g., the data fabric 230 of FIG. 2), can send (in a handshake 440 process) a message, namely a data transfer request message 442, to a controller 420 (e.g., the controller 240 of FIG. 2), requesting the physical layer's 410 service for data transfer. In response, the controller 420 can send a reply message 444 to the transport layer 430, indicating that the physical layer 410 is ready to carry out the requested data transfer. In response, the transport layer 430 can power up the clocks and voltage levels of the physical layer 410, placing the physical layer 410 in a high power state 414 and commencing the data transfer 450 across the USR interconnect 260.

Upon completion of that data transfer 450, the transport layer 430 can send (in a handshake 460 process) a message, namely, an entry request message 462, to the controller 420, indicating that the data transfer 450 has been completed and requesting confirmation that the physical layer 410 is ready to be placed back into low power state. That is, in the example illustrated in FIG. 4, the indication that the physical layer 410 is not transferring data is the indication that the data transfer 450 has been completed. In response, before the controller 420 replies to that message 462, it can initiate a training 470 of the physical layer. That is, the training process of the physical layer is initiated while the physical layer is in a high power state prior to the physical layer entering a low power state. After the training is concluded 472, the controller 420 replies to the entry request message 462, sending the transport layer 430 a reply message 464, indicating that the physical layer 410 is ready to be placed back in a low power state 416. Hence, in this aspect, the controller 420 takes advantage of the fact that the physical layer 410 is now available (upon completion of the data transfer 450, it had been released by the transport layer 430) and is already in an operative state (high power state 414). However, in a situation where a subsequent need for data transfer emerges during the handshake 460, such training may be interrupted, as further described in reference to FIG. 5.

FIG. 5 is a diagram that illustrates a third aspect 500 of scheduling a data link training. In this aspect, during training of the physical layer, a subsequent need for data transfer emerges. For example, as shown in FIG. 5, initially, a physical layer 510 (e.g., the physical layer 250 of FIG. 2) is in a low power state 512 (i.e., inactive and not presently being used for transferring data), but data is due to be transferred across the USR interconnect 260. Consequently, a transport layer 530 (e.g., the data fabric 230 of FIG. 2) can send (in a handshake 540 process) a message, namely a data transfer request message 542, to a controller 520 (e.g., the controller 240 of FIG. 2), requesting the physical layer's 510 service for data transfer. In response, the controller 520 can send a reply message 544 to the transport layer 530, indicating that the physical layer 510 is ready to carry out the requested data transfer. In response, the transport layer 530 can power up the clocks and voltage levels of the physical layer 510, placing the physical layer in a high power state 514, after which the data transfer 550 across the USR interconnect 260 commences.

Upon completion of the data transfer 550, the transport layer 530 can send (in a handshake 560 process) a message, namely, an entry request message 562, to the controller 520, indicating that the data transfer 550 has been completed and that the transport layer 530 is ready to place the physical layer 510 back into a low power state. That is, in the example illustrated in FIG. 5, the indication that the physical layer 510 is not transferring data is the indication that the data transfer 550 has been completed. In response, before the controller 520 replies to that message 562, it can initiate a training 570 of the physical layer. The process described so far (up to the training initiation 570) is similar to the process described (up to the training initiation 470) with respect to FIG. 4.

As mentioned above, however, in a situation where a subsequent need for data transfer emerges during the handshake 560, the transport layer 530 can send another message, namely, a data transfer request message 568, effectively overriding the previous entry request message 562. In such a case, for example, the controller 520 may decide to complete the training process, before replying 564 to the data transfer request message 568, based on an urgency level associated with the requested data transfer. The requested data transfer can be associated with a latency constraint, denoted $T_{Latency}$ 566, indicating the maximum amount of time the physical layer can spend in getting ready to provide the requested data transfer. Typically, the value of $T_{Latency}$ depends on the application associated with the requested data transfer. In response, the controller 520 can assess the amount of time remaining to perform the training of the physical layer 510, denoted $T_R$ 578, and the amount of time determined for the physical layer 510 to prepare for the requested data transfer, denoted $T_O$. If these time values are sufficiently below (e.g., equal to or below a threshold (e.g., 0.95)) the latency constraint (e.g., $(T_R+T_O)$<0.95 T Latency), then the controller 520 can wait for the training process to be completed 572 before sending a reply message 564 to the transport layer 530, indicating that the physical layer is ready to carry out the requested data transfer 580. However, if these time values are not sufficiently below the latency constraint, then the controller 520 will abort the training process before sending the reply message 564 that indicates its readiness to carry out the data transfer 580.

FIG. 6 is a flowchart of an example method 600 for scheduling a data link training by a controller. As shown at block 602, the method includes receiving an indication that a physical layer of a data link is not transferring data. As shown at block 604, the method includes initiating a training process of the physical layer of the data link in response to the indication that the physical layer of the data link is not transferring data.

FIGS. 7A and 7B are flowcharts describing aspects of the method 600 in more detail.

FIG. 7A is a flowchart of an example method 700 for scheduling a data link training. The method 700 is employed by a controller 320 that decides to schedule the training of a physical layer 310 of a data link when the physical layer is inactive (residing in a low power state 312), as described in reference to FIG. 3. The method 700 begins, in step 710, by sending to a transport layer 330 of the data link, an exit request message, requesting to exit the physical layer 310 from the low power state it is residing in, placing it 310 in a high power state. In step 720, a reply message to the exit request message is received from the transport layer 330, confirming that the physical layer 320 is in a high power state. Then, in step 730, the method 700 initiates a training process of the physical layer 320. The initiated training process can be exited from upon completion 352, after which the controller 320 sends a request to the transport layer 330, indicating that it can be placed back into a low power state.

Alternatively, before the training process is completed, the controller 320, can receive from the transport layer 330, a data transfer request message 362, requesting a data transfer through the physical layer 310. In such a case, the controller 320 can respond in three alternative ways. In the first way, the controller 320 exits the training process before its completion. In the second way, the controller 320 exits the training process only upon completion—for example, in a case where an urgency level associated with the requested data transfer is below a threshold. In an aspect, the urgency level associated with the data transfer can be included in the data transfer request message 362. In the third way, the controller 320 can determine a remaining training time 368, representative of time remaining to complete the training process; and exits the training process before its completion, if a time difference between a latency constraint 366 and the remaining training time is lower than a predetermined threshold. A latency constraint is, typically, a time at the end of which the physical layer 310 is expected to begin executing the requested data transfer. Subsequent to exiting the training process (either before or after the completion of the training process), the controller 320 can send to the transport layer 330, a reply message 364 to the data transfer request message 362, indicating that the physical layer is ready to carry out the data transfer 370.

FIG. 7B is a flowchart of another example method 750 for scheduling a data link training. The method 750 is employed by a controller 420, 520 that can decide to schedule the training of a physical layer 410, 520 of a data link when the physical layer is active (residing in a high power state 414, 514), as described in reference to FIG. 4 and FIG. 5. The method 750, in step 760, begins by receiving from a transport layer 430, an entry request 462, indicative that a data transfer 450 had been completed, and requesting a confirmation that the physical layer 410 (currently residing in a high power state 414) is ready to be placed in a low power state (see FIG. 4). Then, in step 770, a training process of the physical layer 410 is initiated 470 before replying to the entry request. When the training process is completed 472, a reply message to the entry request 464 is sent to the transport layer 430, confirming that the physical layer 410 is ready to be placed in a low power state 416.

Alternatively, before the training process is completed, the controller 520, can receive from the transport layer 530, a data transfer request message 568, requesting the transfer of other data through the physical layer 510 (see FIG. 5). In such a case, the controller 520 can respond in three alternative ways. In the first way, the controller exits the training process before its completion. In the second way, the controller exits the training process only upon completion, for example, in a case where an urgency level associated with the requested data transfer is below a threshold. The urgency level associated with the data transfer can be included in the data transfer request message 568, for example. In the third way, the controller can determine a remaining training time 576, representative of time remaining to complete the training process; and exits the training process before the completion of the training process, if a time difference between a latency constraint 566 and the remaining training time 576 is lower than a predetermined threshold. A latency constraint is, typically, a time at the end of which the physical layer 510 is expected to begin executing the requested data transfer. Subsequent to exiting the training process 572 (either before or after the completion of the training process), the controller can send to the transport layer a reply message 564 to the data transfer request message 568, indicating that the physical layer 510 is ready to carry out the data transfer 580.

It should be understood that many variations are possible based on the disclosure herein. Although features and elements are described above in particular combinations, each feature or element can be used alone without the other features and elements or in various combinations with or without other features and elements. A transport layer, as referred to herein, can also represent a data-link-layer. Additionally, a transport layer that powers down a physical layer, as described herein, include also a transport layer that logically disconnects the physical layer. In a logical disconnect, the physical layer is remained powered up but the transport layer has indicated and committed (e.g., via a handshake) to not transfer any data over the physical layer.

The methods provided can be implemented in a general-purpose computer, a processor, or a processor core. Suitable processors include, by way of example, a general-purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine. Such processors can be manufactured by configuring a manufacturing process using the results of processed hardware description language (HDL) instructions and other intermediary data including netlists (such as instructions capable of being stored on a computer readable media). The results of such processing can be mask works that are then used in a semiconductor manufacturing process to manufacture a processor which implements aspects of the embodiments.

The methods or flow charts provided herein can be implemented in a computer program, software, or firmware incorporated in a non-transitory computer-readable storage medium for execution by a general-purpose computer or a processor or hardware finite state machines. Examples of a non-transitory computer-readable medium include read only memory (ROM), random-access memory (RAM), a register, cache memory, semiconductor memory devices, magnetic media such as internal hard disks and removable disks, magneto-optical media, and optical media such as CD-ROM disks, and digital versatile disks (DVDs).

What is claimed is:

1. A method for training a data link opportunistically, the method comprising:
monitoring, while in an operational state, whether a physical layer of the data link of an inter-chiplet interface in a multi-chiplet system is transferring data;
initiating a training process of the physical layer of the data link of the inter-chiplet interface in response to the multi-chiplet system not transferring data; and
selectively aborting the training processing in response to a request to perform a data transfer through the physical layer.

2. The method of claim 1, wherein the monitoring includes receiving an indication that the physical layer of the data link is in a low power state.

3. The method of claim 2, further comprising:
sending an exit request message that requests the physical layer of the data link be placed in a high power state; and
receiving a reply message confirming that the physical layer is placed in the high power state.

4. The method of claim 1, wherein the monitoring includes receiving an indication that a data transfer has been completed.

5. The method of claim 4, further comprising initiating the training process of the physical layer while the physical layer is in a high power state prior to the physical layer entering a low power state.

6. The method of claim 1, wherein the selective aborting includes:
exiting the training process when an urgency level associated with the request exceeds a threshold.

7. The method of claim 1, wherein the selective aborting includes:
not exiting the training process when an urgency level, associated with the data transfer is below a threshold.

8. The method of claim 1, wherein the method further comprises:
determining a remaining training time, representative of time remaining to complete the training process; and
wherein the selective aborting includes:
exiting the training process, in response to a time difference being lower than a threshold, the time difference is between a latency constraint, associated with the data transfer, and the remaining training time.

9. The method of claim 1, wherein the data link of the inter-chiplet interface is an ultra-short-reach (USR) interconnect.

10. A system that is trained opportunistically, the system comprising:
a data link of an inter-chiplet interface in a multi-chiplet system, the data link comprising:
a physical layer configured to transfer data to and from the data link; and
a controller, configured to:
monitor, while in an operational state, whether the physical layer of the data link is transferring data,
initiate a training process of the physical layer of the data link of the inter-chiplet interface in response to the physical layer of the data link not transferring data, and
selectively abort the training processing in response to a request to perform a data transfer through the physical layer.

11. The system of claim 10, wherein the physical layer is monitored by receiving an indication that the physical layer of the data link is in a low power state.

12. The system of claim 11, wherein the controller is configured to:
send an exit request message that requests the physical layer of the data link, residing in a low power state, be placed in a high power state; and
receive a reply message to the exit request message confirming that the physical layer is placed in the high power state.

13. The system of claim 10, wherein the physical layer is monitored by receiving an indication that a data transfer has been completed.

14. The system of claim 13, further comprising initiating the training process of the physical layer while the physical layer is in a high power state prior to the physical layer entering a low power state.

15. The system of claim 10, wherein the selectively abort includes:
exiting the training process when an urgency level associated with the request exceeds a threshold.

16. The system of claim 10, wherein the selectively abort includes:
not exiting the training process when an urgency level, associated with the data transfer, is below a threshold.

17. The system of claim 10, wherein the controller is configured to:
determine a remaining training time, representative of time remaining to complete the training process; and
wherein the selectively abort includes
exiting the training process, in response to a time difference being lower than a threshold, the time difference is between a latency constraint, associated with the data transfer, and the remaining training time.

18. A non-transitory computer-readable medium comprising hardware description language instructions for causing a controller to perform a method for training a data link opportunistically, the method comprising:
monitoring, while in an operational state, whether a physical layer of the data link of an inter-chiplet interface in a multi-chiplet system is transferring data;
initiating a training process of the physical layer of the data link of the inter-chiplet interface in response to the data link not transferring data; and
selectively aborting the training processing in response to a request to perform a data transfer through the physical layer.

19. The non-transitory computer-readable medium of claim 18, wherein the monitoring includes receiving an indication that the physical layer of the data link is in a low power state.

20. The non-transitory computer-readable medium of claim 19, the method further comprising:
sending an exit request message that requests the physical layer of the data link residing in the low power state be placed in a high power state;
receiving a reply message to the exit request message confirming that the physical layer is placed in the high power state.

21. The non-transitory computer-readable medium of claim 18, wherein the monitoring includes receiving an indication that a data transfer has been completed and the method further comprise initiating the training process of the physical layer while the physical layer is in a high power state prior to the physical layer entering a low power state.

* * * * *